United States Patent
Toennessen et al.

(10) Patent No.: US 7,577,060 B2
(45) Date of Patent: Aug. 18, 2009

(54) SYSTEMS AND METHODS FOR STEERING SEISMIC ARRAYS

(75) Inventors: Rune Toennessen, Oslo (NO); Jon Magnus Soerli, Svelvik (NO)

(73) Assignee: WesternGeco L.L.C., Houston, TX (US)

(*) Notice: Subject to any disclaimer, the term of this patent is extended or adjusted under 35 U.S.C. 154(b) by 146 days.

(21) Appl. No.: 11/290,252

(22) Filed: Nov. 30, 2005

(65) Prior Publication Data
US 2006/0227658 A1 Oct. 12, 2006

Related U.S. Application Data

(60) Provisional application No. 60/669,528, filed on Apr. 8, 2005.

(51) Int. Cl.
*G01V 1/38* (2006.01)
(52) U.S. Cl. .............. 367/16; 367/19; 114/253
(58) Field of Classification Search .......... 367/15, 367/17, 20, 144, 153, 154, 16, 19; 114/242, 114/253
See application file for complete search history.

(56) References Cited

U.S. PATENT DOCUMENTS

| | | | |
|---|---|---|---|
| 3,730,483 A | 5/1973 | Newell | |
| 4,087,780 A | 5/1978 | Itria et al. | |
| 4,134,098 A | 1/1979 | Ruehle | |
| 4,323,989 A | 4/1982 | Huckabee et al. | |
| 4,404,664 A | 9/1983 | Zachariadis | |
| 4,485,686 A | 12/1984 | Olmstead, Jr. et al. | |
| 4,506,352 A * | 3/1985 | Brandsaeter et al. | 367/21 |
| 4,748,599 A | 5/1988 | Gjestrum et al. | |
| 4,798,156 A | 1/1989 | Langeland et al. | |
| 4,890,568 A * | 1/1990 | Dolengowski | 114/246 |

(Continued)

FOREIGN PATENT DOCUMENTS

EP 0 018 053 10/1980

(Continued)

OTHER PUBLICATIONS

Christie, "Raising the standards of seismic data quality," Oilfield Review, Summer 2001.

(Continued)

*Primary Examiner*—Jack W. Keith
*Assistant Examiner*—Scott A Hughes
(74) *Attorney, Agent, or Firm*—Fred G. Pruner, Jr.; Richard V. Wells; Jeffrey E. Griffin

(57) ABSTRACT

Marine seismic survey systems and methods are presented. One system comprises a source array, a tow vessel, one or more source tow members, one or more deflecting members operatively connected to the source array; one or more streamers connected to the tow vessel by a corresponding number of streamer tow members, one or more of the streamers positioned by corresponding one or more active or passive streamer deflectors, one or more source separation members connecting one or more source tow members to one or more streamer tow members, and optionally one or more streamer separation members connecting one or more streamer tow members. The one or more source separation members help position the source array in conjunction with the one or more deflecting members. This abstract complies with rules requiring an abstract. It should not be used to limit the scope or meaning of the claims. 37 CFR 1.72(b).

13 Claims, 9 Drawing Sheets

U.S. PATENT DOCUMENTS

| | | | |
|---|---|---|---|
| 4,998,227 A * | 3/1991 | Rygg et al. | 367/177 |
| 5,829,242 A * | 11/1998 | Berglund | 57/295 |
| 6,011,753 A | 1/2000 | Chien | |
| 6,028,817 A * | 2/2000 | Ambs | 367/16 |
| 6,234,102 B1 * | 5/2001 | Russell et al. | 114/253 |
| 6,504,792 B2 * | 1/2003 | Barker | 367/20 |
| 6,681,710 B2 | 1/2004 | Semb | |
| 6,839,302 B2 | 1/2005 | Austad et al. | |
| 2002/0174817 A1 | 11/2002 | Semb | |
| 2005/0180263 A1 | 8/2005 | Lambert et al. | |
| 2007/0019504 A1 * | 1/2007 | Howlid et al. | 367/16 |

FOREIGN PATENT DOCUMENTS

| | | |
|---|---|---|
| EP | 0 168 959 | 1/1986 |
| GB | 2 320 706 | 7/1998 |
| GB | 2 390 589 | 1/2004 |
| GB | 2 400 662 | 10/2004 |
| GB | 2 414 804 | 12/2005 |
| WO | WO 00/20892 | 4/2000 |
| WO | WO 00/20895 | 4/2000 |
| WO | WO 01/16623 | 3/2001 |
| WO | WO 01/61380 | 8/2001 |
| WO | WO 01/84186 | 11/2001 |
| WO | WO 02/47968 | 6/2002 |
| WO | WO 02/059650 | 8/2002 |
| WO | WO 02/103393 | 12/2002 |
| WO | WO 2004092771 | 10/2004 |

OTHER PUBLICATIONS

UK Search Report dated Jul. 24, 2006 for Application No. GB 0606784.7.

"Western and Geco merge; streamers that can be steered," WorldOil.com, 221(7), Jul. 2000.

* cited by examiner

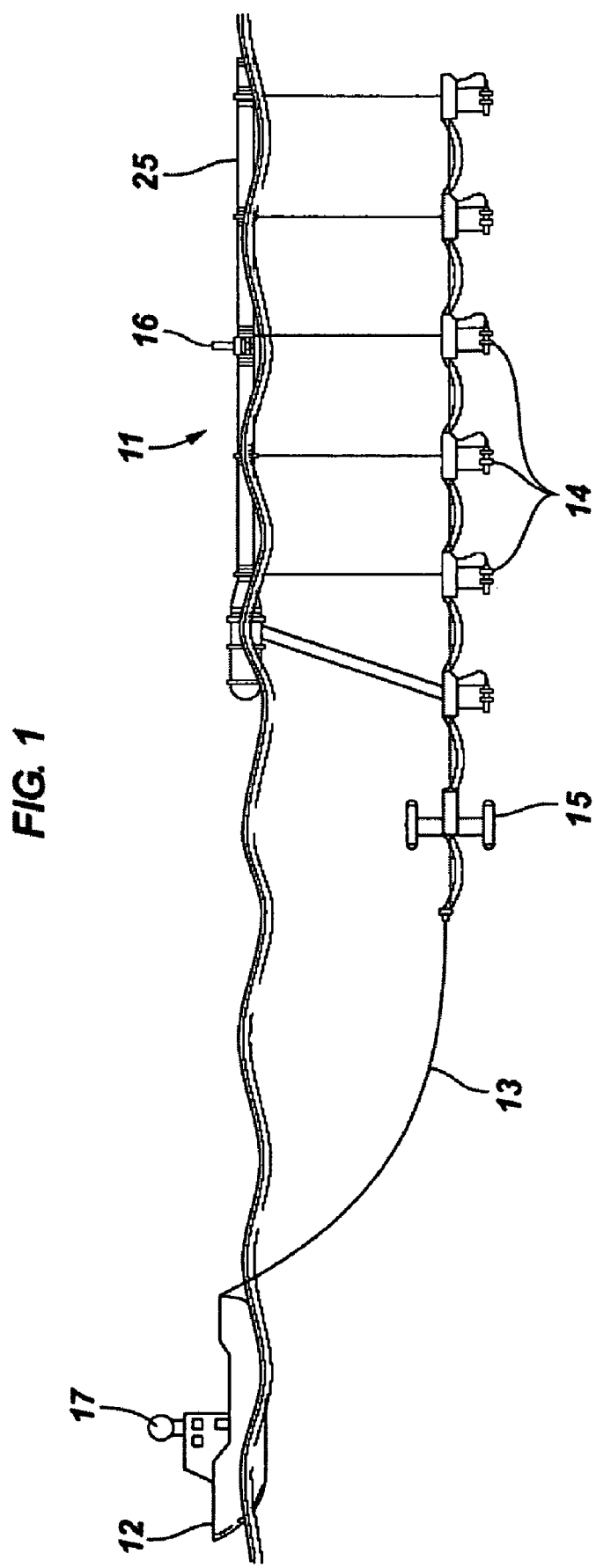

SYSTEMS AND METHODS FOR STEERING SEISMIC ARRAYS

CROSS-REFERENCE TO RELATED APPLICATIONS

This application claims domestic priority benefit under 35 U.S.C. 120 from applicant's provisional patent application Ser. No. 60/669,528, filed Apr. 8, 2005, which is incorporated herein by reference.

BACKGROUND OF THE INVENTION

1. Field of the Invention

This invention relates to seismic exploration and more specifically, to marine seismic survey systems.

2. Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid provide more information regarding the subsurface formations than two-dimensional seismic surveys. 3-D surveys may be conducted with up to twelve or more streamers that form an array covering a large area behind the vessel. The streamers typically vary in length between three and twelve kilometers. Tail buoys attached at the streamer distal ends may carry radar reflectors, navigation equipment, and acoustic transponders. Hydrophones are positioned along each streamer. The hydrophones may or may not be wired together in receiver groups spaced along each streamer. The in-line interval between hydrophones or groups of hydrophones ranges between about 3 and 25 meters, with 12.5 meters comprising typical interval spacing.

Since the grid is often much wider than the array, the tow vessel must turn around and tow the array in laps across the grid, being careful not to overlap or leave large gaps between the laps across the grid.

A multiple streamer array requires diverters near the vessel to pull the streamers outwardly from the direct path behind the seismic tow vessel and to maintain the transverse or crossline spacing between individual streamers. Diverters rely on hydrodynamic lift created by forward motion through the water to pull the streamers outwardly and to maintain the transverse position relative to the vessel path. If forward motion changes due to ocean currents and other environmental factors, the diverters may not maintain the desired streamer position.

In 4-D geophysical imaging, a 3-D seismic survey is repeated over a grid that has been previously surveyed. This series of surveys taken at different times may show changes to the geophysical image over time caused, for example, by extraction of oil and gas from a deposit.

It is important that the sources being used to generate the acoustical pulses be located as closely as possible to the same location as in previous surveys over the same grid. This, of course, has been difficult to accomplish in a marine survey because the acoustical source arrays are typically towed behind the tow vessel and are subject to wave and current movement.

In addition to the deployment and operation difficulties associated with towing multiple streamers, conventional techniques limit the ability to position source equipment and receivers in different relative positions and orientations. Because the sources and receivers are towed behind the same seismic vessel, array design is limited by the tow configuration and vessel layout. Each towed array is also subject to crosscurrents, wind, waves, shallow water, navigation obstacles, and steering limitations that limit the coverage provided by the survey system.

Conventionally, attempts to control the location of source arrays have included attaching the arrays to distance cables running to other deflectors or tow cables. These attempts have not provided optimal control of the location of the source arrays under towing conditions. The deflector wing inventions disclosed in WO2004092771 A2, published Oct. 28, 2004, (the '771 application) address these problems for the case of using a single source array. By attaching one or more deflector wings to the front of the source array, or a winch to the front of the source array that acts on a lateral deflector, the source array location may be controlled. However, additional problems present themselves when so-called dual sources are utilized. A dual source arrangement comprises two or more source arrays being positioned symmetrically about the tow centerline and configured to fire in an alternating manner. In this configuration each source array needs to be deflected laterally to its nominal position, different from zero. If one in addition desires to steer each source array so as to correct for deviations from the nominal position and/or steer the source arrays to follow a path from a previous survey, the source deflectors need both to spread the source out to a nominal position and to be able to correct for the deviations on top of the nominal positions. To be able to do this the source deflectors need to be of a considerable size, larger than what is required for deflecting in order to counteract for the deviations from the nominal position only, thus adding to the cost of the system, as well as complicating the handling during deployment and retrieval of the source system.

Accordingly, a need exists for improved techniques and equipment for conducting marine seismic operations. It would be advantageous if such techniques and equipment could be utilized with both single and dual acoustic sources, especially while positioning them in desired locations while being towed behind a vessel.

SUMMARY OF THE INVENTION

The present invention provides marine seismic survey systems that comprise a source array, sometimes referred to in the art as a gun-array or a sub-array, the source array comprising one or more source members, sometimes referred to herein as air-guns, the source array connected to an independently steerable deflecting member that controls the crossline position of its respective source array. As used herein the term "source array" is meant to be broader than the term gun-array, which those skilled in the art will recognize as meaning one or more air-guns. The term "source member" is meant to be broader than the term air-gun, and is meant to include all acoustic sources, including, but not limited to, air-guns, oscillating members, vibration members, explosive charges, percussion devices, and the like. Thus, in the same way that a gun-array includes one or more air-guns, a source array comprises one or more source members. The terms source-array, gun-array and sub-array are also often used interchangeably in the art to call out an assembly including an array of airguns, float, chains, hang plates, everything required to position the gun-array and have it functioning. The term source array will be used herein. Finally, the terms "source", "seismic source", and "marine seismic source" are used interchangeably herein, unless a specific embodiment requires a different meaning, and comprise some or all source members (e.g., air-guns) fired at the same time. A source may comprise from one to ten source arrays, more typically one to four source arrays. In this regard, the art distinguishes between dual source and single source. Dual source systems comprise two or more sources, each of say three source arrays, where each source is located offset to the centerline. A single source may comprise three source arrays where the center of the source is located at the centerline. A "separation member" is a cable or strength-taking umbilical connecting tow or more tow members. A "source separation member" connects a source tow member to a streamer tow member, while a "streamer separation member" connects two or more streamer tow members.

Systems of the invention may comprise many alternative arrangements for connecting the tow vessel, source, and deflector, and all are considered within the scope of the invention, as long as one or more separation cables are employed. As used herein the terms "active" and "passive" refer to the ability and non-ability to communicate, respectively, of a connection between a tow vessel and a source, between a tow vessel and a deflector (with or without streamers), and between a source and a deflector (with and without streamers). "Tow member", as used herein, may be an active or passive connection device, and may be a strength-taking component or non-strength-taking component. A strength-taking component is one that is intended to pull, or help pull any of a source array, a deflector, and/or a streamer. The term "umbilical" when used without qualification means an active, data transmitting tow member that is substantially non-strength-taking; in other words an umbilical can withstand some tension, but is not meant to pull a source array or deflector, unless it is a strength-taking umbilical. Any combination of remotely controllable deflector being connected to and towed by the tow vessel, or towed by the source with and without connection to the tow vessel, and any practical combination of passive tow member with an umbilical, using both wherein at least one is a strength-talking tow member, or using only a strength-taking umbilical if desired, are intended to be within the invention.

As used herein the term "deflecting member" is to be distinguished from the term "deflector." As used herein a "deflecting member" is a member that is a component of and deflects a source array. Deflecting members useful in the invention may comprise a low aspect ratio member or a high aspect ratio member. A deflecting member may be suspended between the float and one or more of the source members or the deflecting member may be rigidly attached to a float. In any case, the deflecting member may be positioned between the float and some or all of the source members, or even in front of the source array. The term "deflector" means, as will become apparent, means a discrete device or apparatus connected to the source via one or more active or passive tow cables. The term "source deflector" is used in embodiments where there are no streamers. Deflectors themselves may be active or passive. Systems of the invention may include deflecting members but not deflectors, deflectors but not deflecting members, or both deflecting members and deflectors. While each deflecting member may be connected between the source array tow cable (or umbilical) and its towed source array, a deflecting member may also be placed at the aft end of its source array or contained somewhere between the front and aft ends of the source array.

When the source array or arrays are towed in the presence of seismic streamers from the same vessel, in one embodiment of the invention an umbilical or source array tow cable that is most starboard or most port with respect to the nominal position may be connected, using a separation cable, with a streamer tow cable that connects the tow vessel with a streamer. Alternatively, if the tow vessel is a "pure" source vessel (meaning it only tows seismic sources) then the separation cable may be connected to a deflector tow cable that is in turn connected to a deflector. Some or all source array tow cables and streamer tow cables may be connected with one or more separation cables. Also the source arrays may be connected together with source array distance ropes/cables. In this fashion, the deflecting member concept is much more attractive, since individual deflecting members can be smaller in size and weight compared to the situation where no separation rope is employed. This allows the same deflecting members to be used for single seismic source measurements as well as dual seismic source measurements.

Thus, using the above definitions, one aspect of the invention is a system comprising:
  a marine seismic source array connected to a tow vessel by one or more source tow members;
  one or more deflecting members operatively connected to the source array;
  one or more source deflectors operatively connected to the tow vessel by one or more source deflector tow members, wherein the source deflectors and the deflecting members are capable of controlling a position of the source array; and
  one or more separation members connecting the one or more source tow members and the one or more source deflector tow members.

As used in this embodiment the phrase "capable of controlling a position" means that either one of or both of the deflecting member and source deflector may be controlling position of the source array at any given time. It not necessary that they both be operating at any moment N in time, but in the next moment (N+1) in time they might both be operating to control position of the source array, depending on the desired position and extraneous conditions, such as weather, obstructions, and the like.

When the tow vessel is towing both seismic sources and receivers in the form of one or more seismic streamers, the systems comprise:
  a marine seismic source array connected to a tow vessel by one or more source tow members;
  one or more deflecting members operatively connected to the source array;
  one or more marine seismic streamers connected to the tow vessel by a corresponding number of streamer tow members, one or more of the streamers positioned by corresponding one or more active or passive streamer deflectors; and
  one or more source separation members connecting one or more source tow members to one or more streamer tow members, and optionally one or more streamer separation members connecting one or more streamer tow members;
  whereby the one or more source separation members are capable of controlling position of the source array in conjunction with the one or more deflecting members.

As used in this embodiment the phrase "capable of controlling a position" means that the one or more source separation members and the one or more deflecting members work together to control position of the source array. In most embodiments, the deflector will be positioned at the intersection of the streamer and its tow cable, and may be referred to as a streamer deflector, while streamer steering devices such as those known under the trade designation Q-FIN (WesternGeco L.L.C., Houston, Tex., USA) will almost always be used to steer along the length of a streamer. However, while a streamer deflector is normally at the intersection of the streamer and its tow cable, the invention is not so limited. The systems of the invention may comprise a plurality of source arrays and forming a source, each source array connected to the tow vessel by its own source tow member, and each source array having its own deflecting member. In addition the source arrays may be connected together with array-to-array distance ropes. Systems of this aspect of the invention may comprise a one or a plurality of streamers, and the source separation members may connect the outer-most source tow member to any streamer tow member. Alternatively, the source separation member may connect all source tow members of a given source at a point between the tow vessel and the source, the source separation member extending from the point to one or more streamer tow members. Alternatively, the source separation member may comprise a plurality of source separation members, each extending from one source tow member to one or more streamer tow members. When the source separation member comprises a plurality of source separation members, each of the separation members may extend from a corresponding source tow member to any streamer tow member.

Systems of the invention may comprise one or more positioning systems, particularly wherein the positioning system is selected from a global positioning system, an acoustic network, and a laser system, and systems wherein the positioning system is a satellite positioning system. Systems of the invention may comprise a positioning unit attached to each source or each source array, wherein the positioning unit provides a signal to inform the controller of a current position of the source or source arrays. Systems of the invention may also comprise one or more controllers allowing a source member in a source or source array to be triggered when the source or source array is at a desired position. Such controllers may be positioned at locations selected from the tow vessel, the source array, one or more of the deflectors, one or more of the deflecting members, and combinations thereof.

Systems of the invention may comprise one or more controllers for controlling a desired position of one or more of the deflectors and deflecting members, particularly systems wherein a desired position of a source is identical to a position as in a previous seismic survey, and wherein the desired position avoids gaps in coverage.

Deflectors and deflecting members useful in the invention may be any type known in the art, and may be generically referred to as an "adjustment mechanism." When discussing an adjustment mechanism connected to the source array and source tow member, the adjustment mechanism may be adapted to actively manipulate an angle of attack of the source array. As used herein, "actively manipulate" means controlling the angle of attack either directly or indirectly in response to, and/or in anticipation of, an undesirable change in movement of the source array. "Controlling" may be performed locally on the source array, or remotely through any type of communication system. "Angle of attack" means, when referring to a seismic source array, the angle that the body of the source array makes relative to the direction of flow of water past it, sometimes referred to as the flow vector. This may also be described as the angle that the body of the source array makes relative to its direction of travel through the water. The flow vector may or may not be parallel to the tow member. The adjustment mechanism may be connected to the source array at one or a plurality of tow points located on the source array, and may include a towing harness. The tow point may be located at a front end of the source array, or at a position between the front end of the source array and a rear end of the source array. The adjustment mechanism may comprise a deflecting member positioned between the float and one or more of the source members, and may further comprise a rigid moment-transfer member having first and second portions, which may or may not be ends, the first portion connected to the source tow member, the second portion connected to a tow point on the deflecting member through a swivel joint, where the swivel joint may be a hinged joint, ball joint, or equivalent function joint. The adjustment mechanism may further comprise an actuator mounted on the deflecting member near the tow point and adapted to actuate the rigid moment-transfer member. The rigid moment-transfer member may be a solid member or hollow, and the solid and hollow members may be cylindrical members, parallelepiped members, or equivalent functional members. The rigid moment-transfer member may also be a telescoping member, an I-beam, or other equivalent functional configuration. The adjustment mechanism may comprise either a low or high aspect ratio deflecting member positioned between, or in front of a float and one or more source members. In this arrangement, the adjustment mechanism may include a bridle system, and a rotatable connector may be operatively connected to the deflecting member and adapted to function with the bridle system. The rotatable connector may be positioned on the deflecting member approximately at a mid-section of the deflecting member. A local controller may be mounted on the apparatus, the local controller adapted to receive a signal from an on-board controller on a tow vessel or other remote controller and send a signal to the local controller, which then operates an actuator and rotatable connector. The bridle system may comprise a front bridle leg attached to a front end of the deflecting member, and an aft bridle leg comprising a loop that passes through the rotatable connector, and thus the bridle system may be remotely controllable. The bridle system may include a frame that is connected to a front end of the deflecting member via a swivel joint and adapted to pivot about the swivel joint, and the frame may attach to an aft bridle leg comprising a loop that passes through the rotatable connector. The frame may be a triangular frame, or any other shaped frame that performs the equivalent function of moving the bridle legs when actuated. Another alternative is to replace all or substantial portions of the bridle legs with linear actuators. In this latter embodiment, the adjustment mechanism may be a combination of a frame, linear actuators, and a high aspect ratio deflecting member. Other adjustment mechanisms useful in the invention include those wherein the deflecting member and/or the streamer deflector (or deflector, in embodiments without streamers) comprises one or more wings, and a central body, wherein the one or more wings are disposed adjacent to the central body. Other deflector designs are useful in the invention, such as door-type deflectors, main wing-boom-mini-wing deflectors, and the like. Deflectors may be active or passive, where active refers to the ability to remotely control position, or steer the deflector. An actuator may be disposed on the deflecting member or deflector, wherein a controller sends a signal to the actuator, and wherein the actuator moves a control surface, such as a wing. The actuator may employ a motive force selected from pneumatic, electric and hydraulic. The body and the actuator may be made of a material selected from metal, composite and combinations thereof, such as a metal skin covering a foam core, wherein the metal skin is selected from titanium, stainless steel, and the like. In systems of the invention employing wing-type deflectors, the total area of the wing may range from about 1 to about 7 square meters. Systems wherein one or more deflectors and/or deflecting members are in a generally vertical arrangement or a generally horizontal arrangement are considered within the invention.

A second aspect of the invention is methods of steering a marine seismic system, one method comprising the steps of:
connecting a source deflector tow member to a source tow member with a separation member;
positioning a source array with a passive or active source deflector, the source deflector connected to the source deflector tow member; and
steering the source array with one or more deflecting members, the source array connected to the source tow member.

Another method of the invention, used when seismic streamers are present, includes:
Methods in accordance with the invention are those wherein the steering comprises steering to a desired position, wherein the desired position avoids gaps in coverage or wherein the desired position is identical to that of a previous survey; those methods further comprising providing the desired position to a controller; and methods further comprising triggering a source member or members on a source array when at the desired position.

Further advantages and features of the invention will be apparent upon review of the brief description of the drawings, the detailed description of the invention, and the claims which follow.

BRIEF DESCRIPTION OF THE DRAWINGS

FIG. 1 is side view of a vessel towing a source array deployed with one of many possible deflecting members useful in accordance with the present invention;

DETAILED DESCRIPTION OF THE INVENTION

Figure 2A:
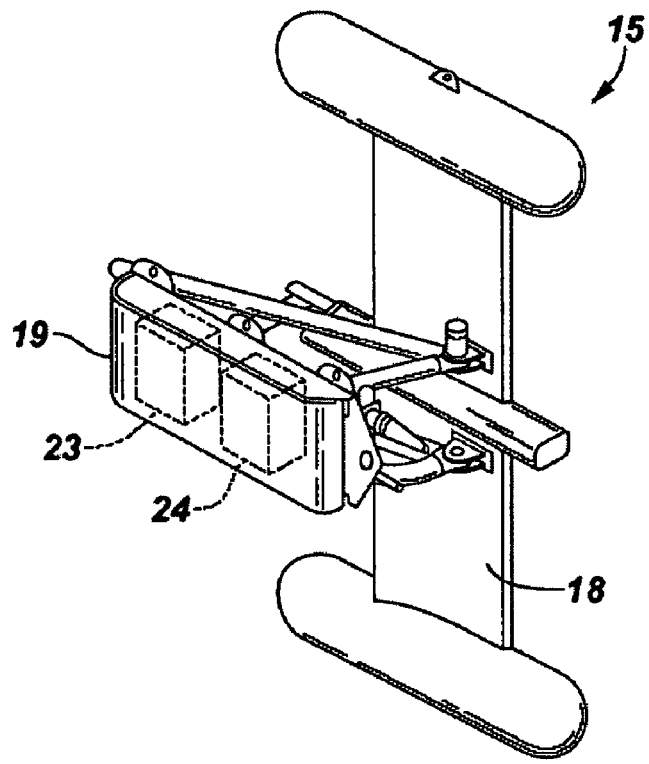
FIGS. 2A-2B are perspective views of each side of the deflecting member depicted in FIG. 1.

The present invention provides systems and methods that may be used for conducting seismic surveys of the subsurface geological formations that underlie a body of water. The nominal offset lateral position of each source is achieved, in accordance with the present invention, by use of a separation cable between one or more source tow members and either a streamer tow member, or in the case of a pure source vessel, a deflector tow member.

FIG. 1 is a side view of a tow vessel 12 towing a seismic source, including source array 11, by a source tow member 13. A source array float 25 has several acoustic source members 14 suspended therefrom. Source members 14 may be compressed air guns, which are fired to generate acoustical waves that are reflected from the subsurface geological features back to receivers (not shown) during a seismic exploration. Source members 14 may be other acoustical-wave generation device, such as explosives, percussion devices, and the like. A deflecting member 15 is connected to source tow member 13 between vessel 12 and source array 11 such that source array 11 trails deflecting member 15 in this embodiment. Alternatively the deflecting member may be mounted between the source array float 25 and the source members 14. Also mounted on source array float 25 may be a global positioning system (GPS) unit 16 that notifies a navigation system 17 of tow vessel 12 of the exact location of source array 11. It should be understood that there are many types of adjustment mechanisms available for use in the invention, and that deflecting member 15 is merely one example of such a device.

Figure 2B:
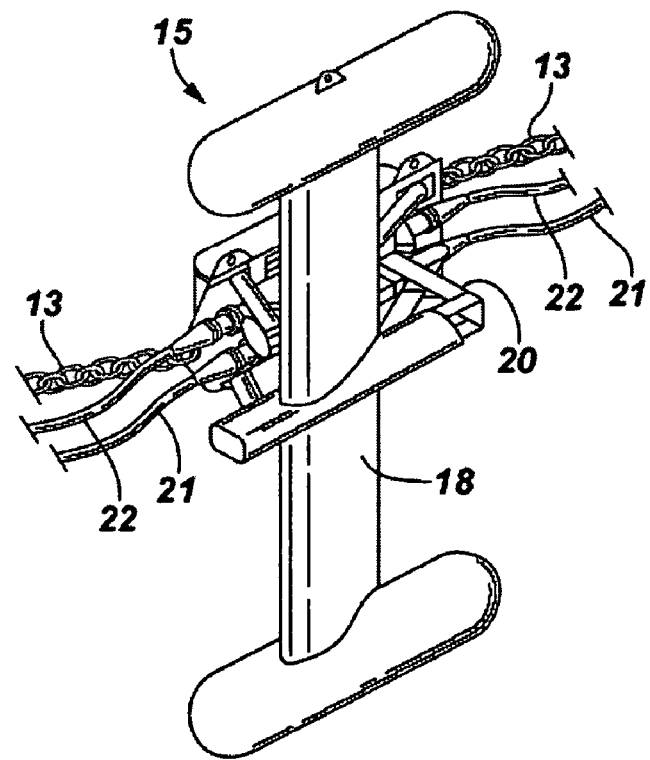

FIGS. 2A-2B are perspective views of each side of deflecting member 15. This type of deflecting member includes a moveable wing 18 disposed adjacent to a streamlined central body 19. An actuator 20 moves wing 18 about the wing's vertical axis. Central body 19 may also contain a local controller 24 and sensors (not shown) for monitoring the movement of wing 18 and contain the motor (not shown) that drives actuator 20 and optionally, batteries 23. A passive, strength-taking tow member 13 may attach to deflecting member 15 for towing deflecting member 15 by tow vessel 12 and connects deflecting member 15 to source array 11 being towed. Umbilicals 22 comprising electrical wire, optical fiber or a combination thereof may be connected to deflecting member 15 to allow provision of electrical power thereto and to carry control signals to and from deflecting member 15. In embodiments where the source members are compressed air-guns, a high pressure hose 21 may also be connected to deflector 15 to provide high pressure air to air-guns 14 (FIG. 1). Other substantially non-strength-taking umbilicals may be employed, depending on the needs of the particular source members used.

Figure 3:
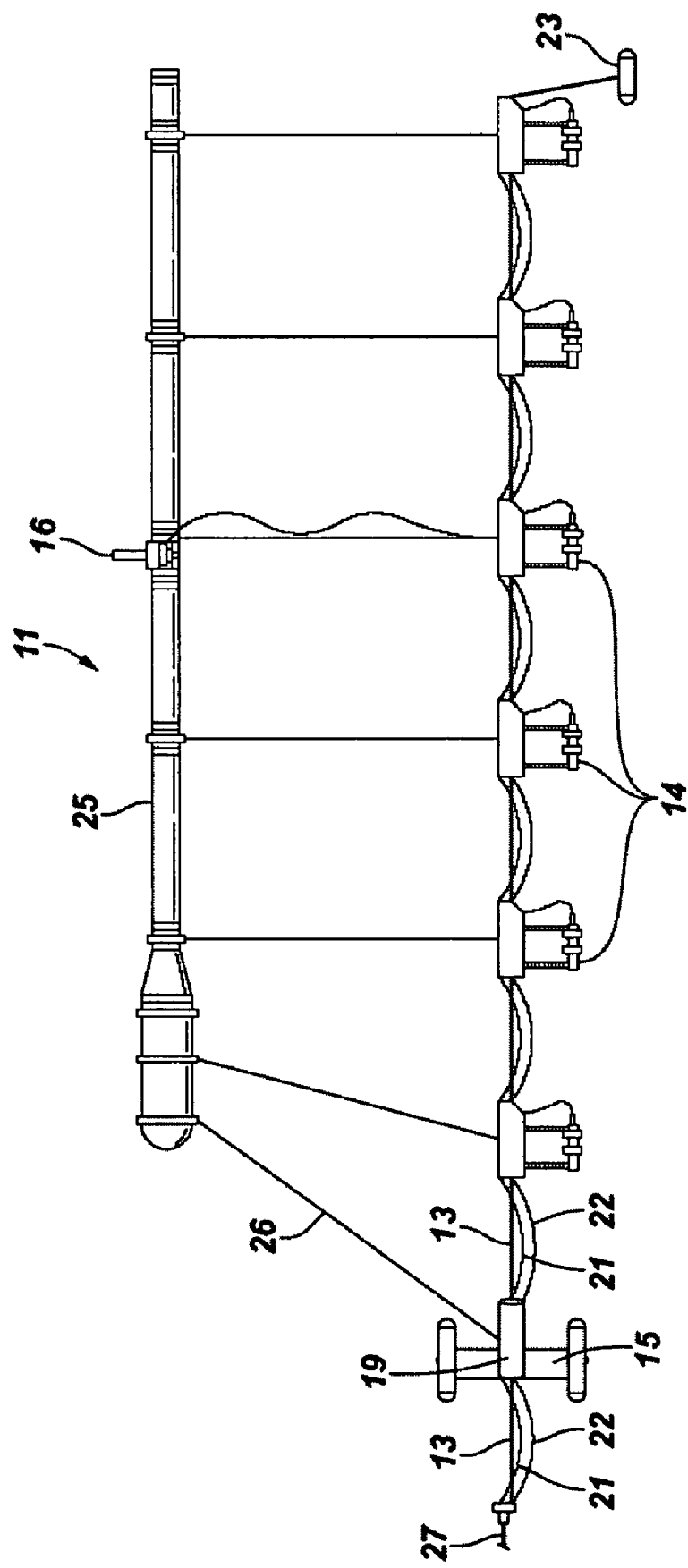
FIG. 3 is a side view of the deflecting member of FIGS. 2A-2B coupled to the source tow member between the tow vessel and a source array in accordance with the present invention.

FIG. 3 is a side view of a deflecting member 15 coupled to passive, strength-taking source tow member 13 between tow vessel 12 and source array 11 in accordance with the present invention. Source tow member 13 functions with tow vessel 12 (not shown) to tow source array 11 and deflecting member 15 though the water. Central body 19 is adapted to be connected to source tow member 13 between tow vessel 12 and source array 11. The electrical, optical, or combination of cables 22 may contain electrical power conductors, control signal conductors and fiber optics for sending and/or receiving electrical power and control signals and is shown connected to central body 19. Also shown connected to central body 19 is high-pressure hose 21 for supplying high-pressure air to the air guns. A bulkhead 27 provides connections for cable 22 and high-pressure hose 21. Cables 26 connected to a source array float 25 support deflecting member 15. Positioning units, GPS unit 16 and acoustic sensor 23 are illustrated mounted to float 25 and acoustic source members 14 are illustrated suspended from float 25.

Figure 4:
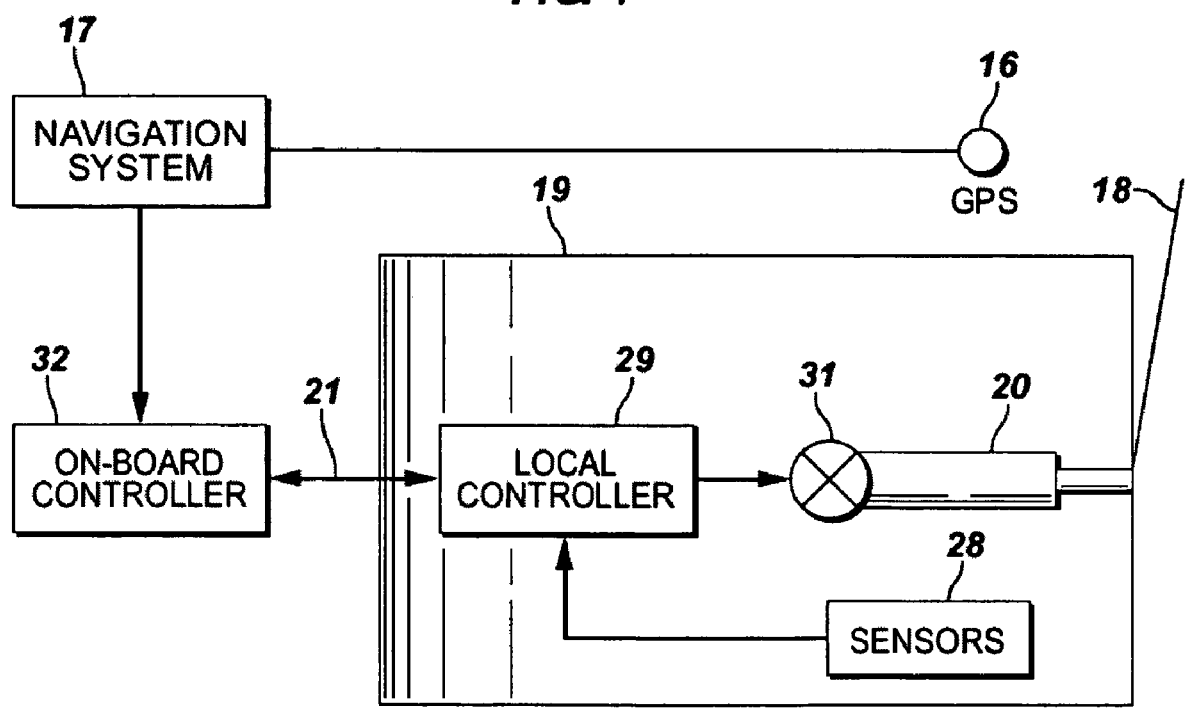
FIG. 4 is a schematic diagram of a control scheme to steer a source array in accordance with the present invention.

FIG. 4 is a schematic diagram of a control scheme that may be used in conjunction with positioning deflectors and deflecting members in accordance with the present invention. A similar set up and control scheme may be used for other types of adjustment mechanisms. For positioning a deflecting member of a source array, positioning unit 16, 17 mounted on source array 11 (FIG. 1) transmits the position of source array 11 to navigation system 17 located on tow vessel 12 (FIG. 1). Navigation system 17 provides the location information received from positioning unit 16 to an on-board controller 32. On-board controller 32 may be a computer, a distributed control system, an analog control system or other control device known to those having ordinary skill in the art. On-board controller 32 may communicate with a local controller 29 through an umbilical 27, but may communicate through a wireless transmission, or some combination thereof. Umbilical 27 contains conductors for providing power and control signals to and from the adjustment mechanisms, in this example central body 19. Local controller 29 sends a signal to an electric motor 31 that moves actuator 20, which in turn moves a bridle, cable, or other control mechanism, in this example a wing 18. When wing 18 moves, the lateral force imparted against the wing by the water steers source array 11 to the desired position. Sensors 28 detect the angular position of wing 18 and send this information back to local controller 29 and, optionally, to on-board controller 32 where it may be displayed for an operator to read.

Figure 5:
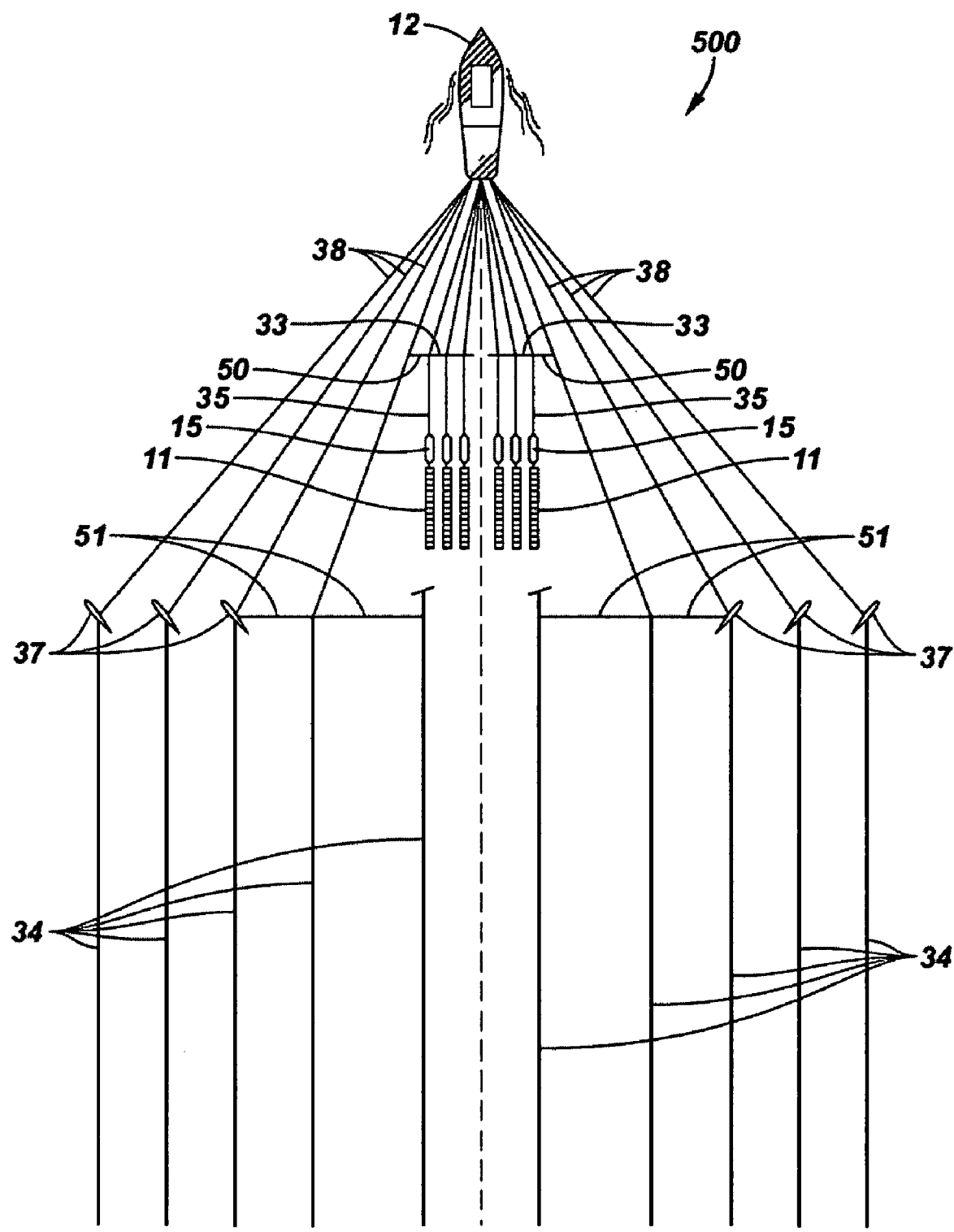
FIGS. 5, 6, 7, and 8 illustrate aerial views of four different marine seismic survey systems in accordance with the invention.

FIG. 5 is an aerial view of a marine seismic survey system 500 of the invention, with tow vessel 12 towing dual sources. Each source has three source arrays 11 in this embodiment, each source array 11 deployed behind tow vessel 12 with its own source tow member 35. Distance cables 33 couple adjacent source tow members 35 together and maintain a set distance between each of the adjacent source arrays 11. Further, each source array 11 is steered with one deflecting member 15. In this embodiment, tow vessel 12 is also towing a plurality of seismic streamers 34, although I certain embodiments a single streamer may be employed. Five starboard and five port streamers are illustrated. In the embodiment depicted in FIG. 5, three starboard outer-most streamers 34 each have a deflector 37, each pair of streamers and deflectors towed by a streamer tow member 38 that deflects the three starboard outer-most seismic streamers 34 laterally to starboard, while three port outer-most streamers 34 each have deflectors 37 towed by streamer tow member 38 that deflect the three port outer-most seismic streamers 34 laterally to port. Streamers that are not connected directly to a deflector may optionally be deflected by streamer separation members 51 connecting the streamers. In accordance with the embodiment illustrated, each source is deflected laterally to a nominal starboard or port position referring to a centerline 155. As may be seen in FIG. 5, the nominal offset lateral position of each source is achieved, in this embodiment, by use of source separation members 50. Source separation members 50 may be attached to source tow members 35 at some distance between tow vessel 12 and source arrays 11. In order to allow for sufficient steering by deflecting members 15, source separation cables 50 may be attached to source tow members 35 at some minimum, distance from its respective source array. In other words there is an inverse relationship between the power requirements of deflecting members 15 and the distance that source separation cables 50 may be from the sources.

Since the nominal offset lateral positions of each source are achieved at least in part by use of source separation cables 50, the steering and power requirements of deflecting members 15 may be less. The remaining, reduced functions of deflecting members 15 are twofold. First, if the source steering target is to keep the source on the nominal offset lateral positions, deflecting members 15 correct for any deviations thereof. Secondly, if the source steering target is to follow the source track of a previous survey, that is, deviations from the nominal, then deflecting members 15 correct for the difference between the nominal tracks and the desired track from the previous survey.

Figure 6:
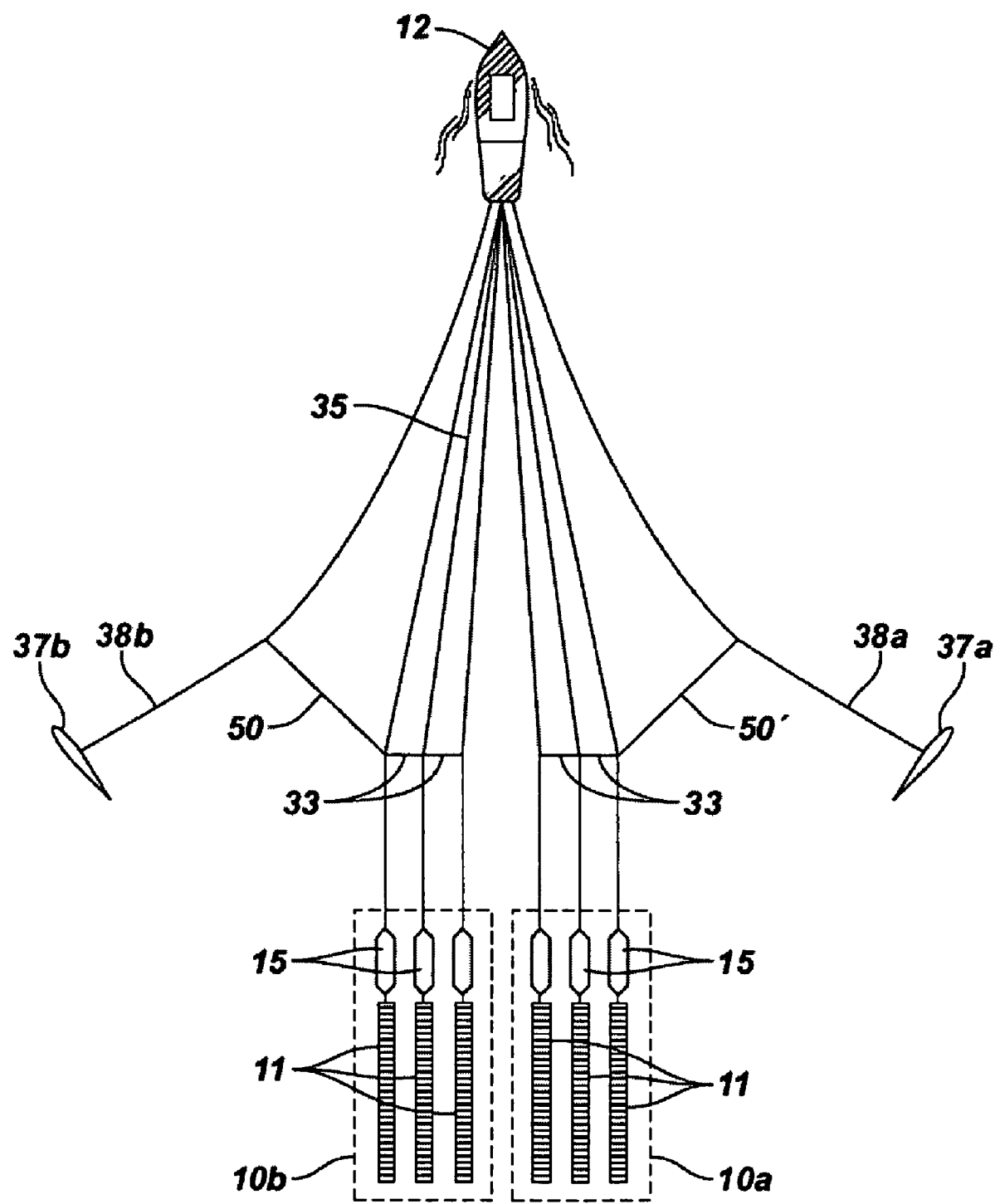
Figure 7:
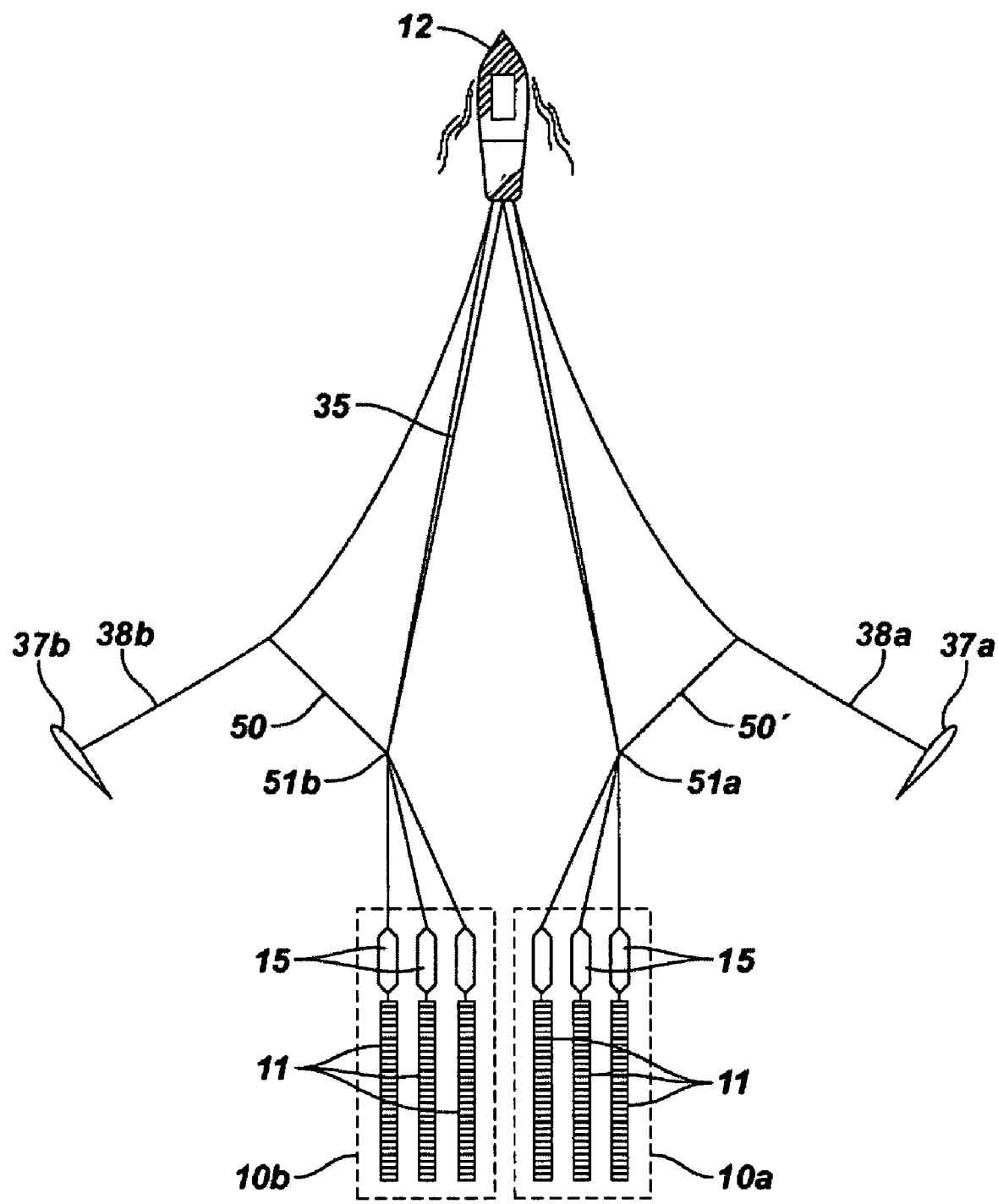
Figure 8:
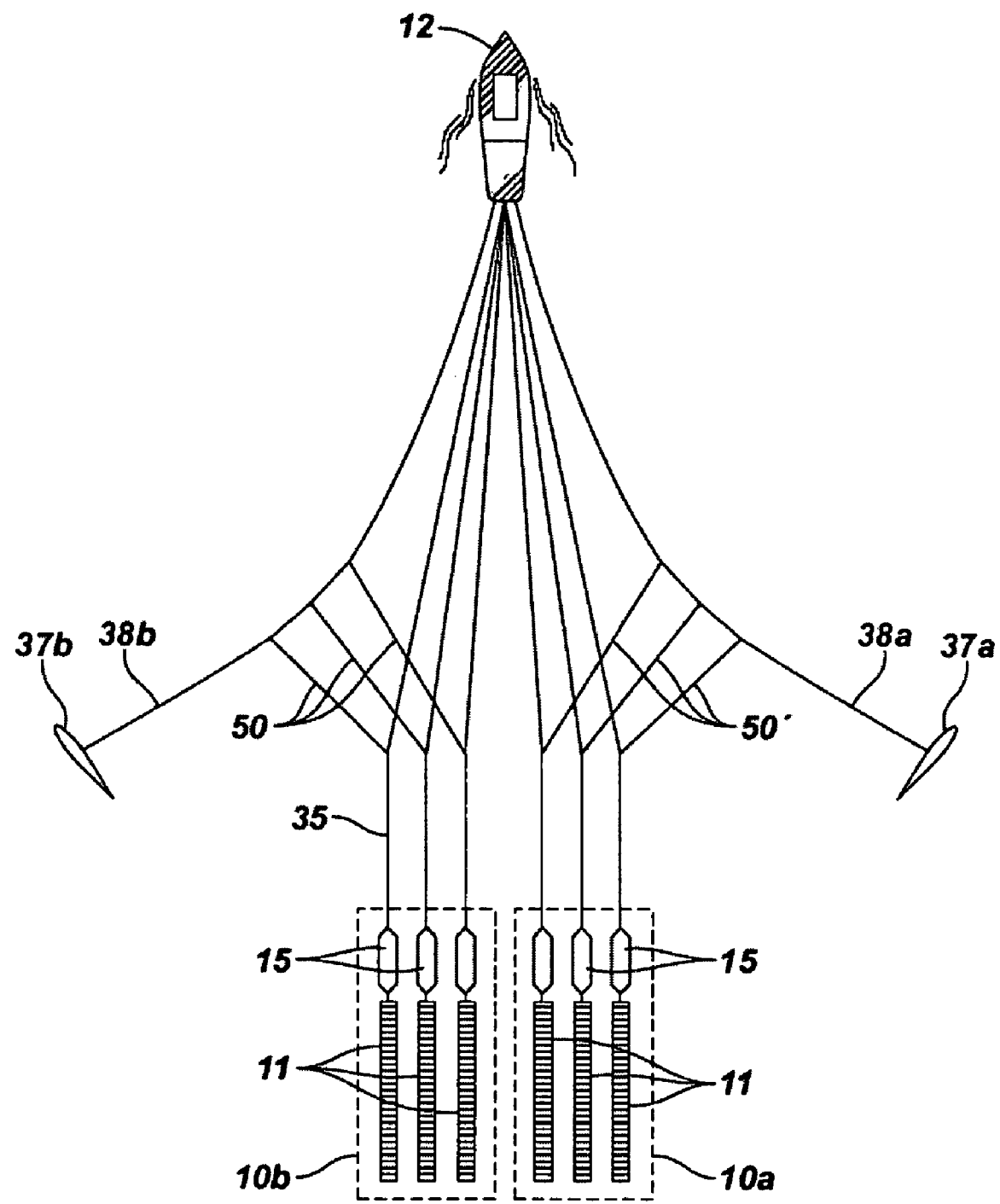

Other separation member schemes may be appropriate in the system of FIG. 5, as are explained more clearly in conjunction with FIGS. 6, 7, and 8, which depict schematically a pure source vessel 12 with no streamers. It will be understood that the separation member connections illustrated in FIGS. 6, 7, and 8 may also be employed as alternatives to the separation member connections depicted schematically in FIG. 5. FIG. 6 illustrates one alternative, where tow vessel 12 pulls sources 10a and 10b, each source having three source arrays 11. In this embodiment each source array 11 has a deflecting member 15 in front position, it being understood that these could be positioned anywhere along source arrays 11. Each source array 11 is attached to tow vessel 12 via its own source tow member 35, which may be a strength-taking umbilical, or a passive strength-taking tow member and a separate umbilical, allowing communication between tow vessel 12 and source arrays 11. Optionally, a single umbilical could be employed to supply communication and data transmission functions to and from all source arrays 11, while each source array 11 is pull by a passive, strength-taking tow member. In this configuration the air supply to the source members could be provided by either an umbilical or the passive tow member. Distance cables 33 are illustrated between each source tow member 35. Deflectors 37a and 37b are respectively connected to tow vessel 12 by separate deflector tow members 38a and 38b. In accordance with the invention, a separation member 50' connects a starboard-most source tow member 35 with deflector tow member 38a, and a separation member 50 connects a port-most source tow member 35 with deflector tow member 38b. Separation members 50 and 50' provide the opportunity to use smaller deflecting members 15, since deflectors 37a and 37b contribute to the deflection forces supplied by deflecting members 15 by pulling sources 10a and 10b away from centerline.

FIG. 7 illustrates an alternative to that illustrated in FIG. 6. Shown in FIG. 7 is a pure source tow vessel 12 pulling sources 10a and 10b, each source having three source arrays 11, each source array 11 having a deflecting member 15 in front position. Each source array 11 is attached to tow vessel 12 via its own source tow member 35. In this embodiment, there are no distance cables, but rather two separation members 50' and 50 are used to connect deflector tow members 38a and 38b, respectively, to all of the respective source tow members 35 at points 51a and 51b, respectively. Once again, deflectors 37a and 37b are then able to contribute to the deflection forces supplied by deflecting members 15.

FIG. 8 illustrates an alternative to that illustrated in FIGS. 6 and 7. Shown in FIG. 8 is a pure source tow vessel 12 pulling sources 10a and 10b, each source having three source arrays 11, each source array 11 having a deflecting member 15 in front position. Each source array 11 is attached to tow vessel 12 via its own source tow member 35. In this embodiment, there are no distance cables, but rather a plurality of separation members 50' and 50 are used to connect deflector tow members 38a and 38b, respectively, to an equal plurality of respective source tow members 35. In other words, there are an equal number of separation members and source tow members. As in the embodiments illustrated in FIGS. 6 and 7, deflectors 37a and 37b are then able to contribute to the deflecting forces supplied by deflecting members 15, allowing smaller deflecting members 15 to be employed.

Alternatives of using separation members other than those depicted in FIGS. 5, 6, 7, and 8 will be apparent to those having ordinary skill in the art, and are considered within the invention.

Figure 9A:
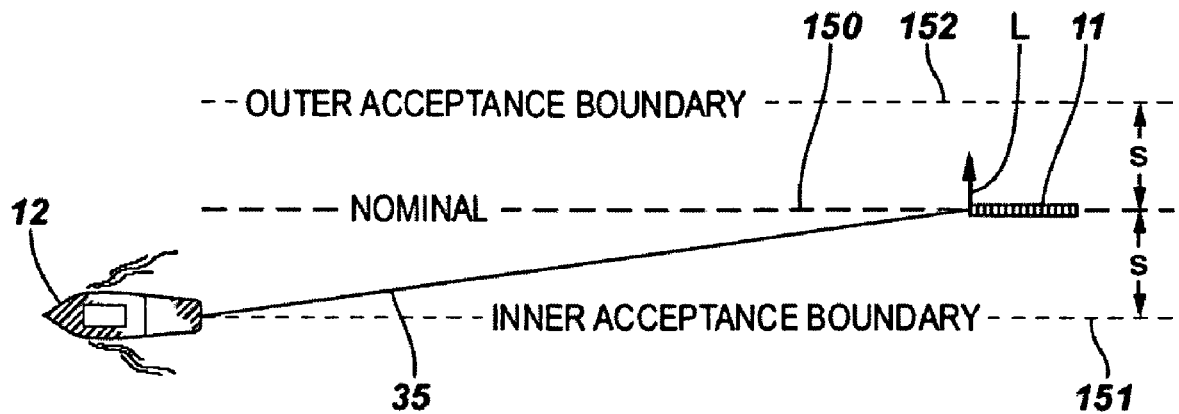
FIGS. 9A-9C are schematic diagrams illustrating force requirements for steering dual marine sources within the invention.
Figure 9B:
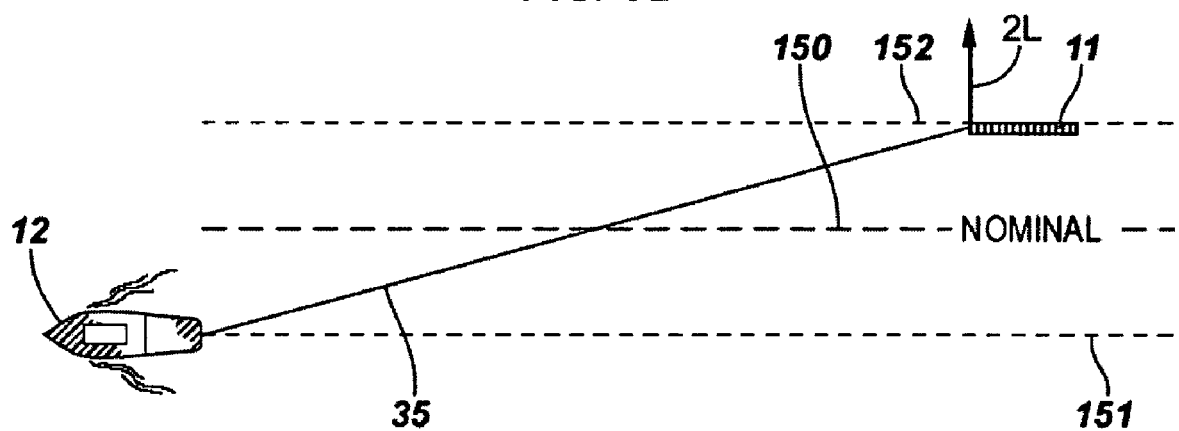
Figure 9C:
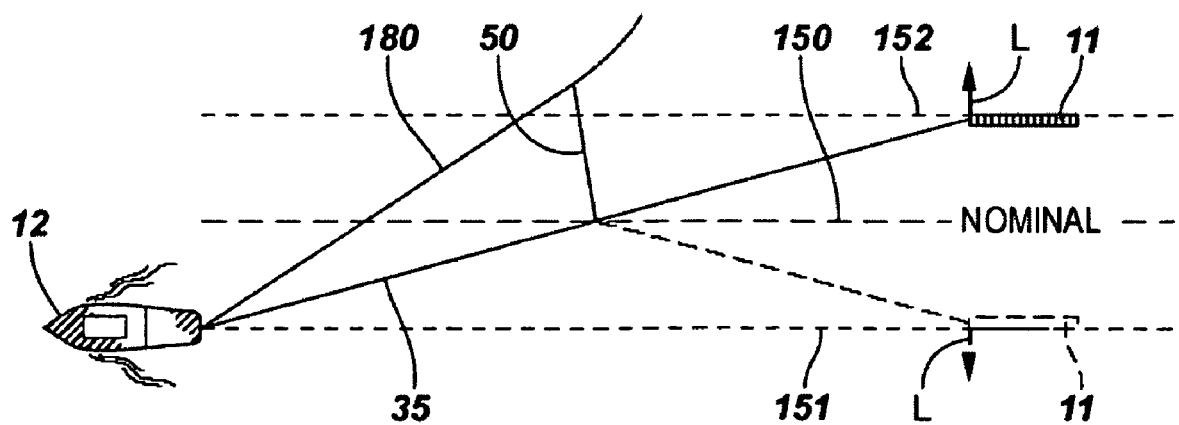

FIGS. 9A-C illustrate schematically the deflection force requirements for steering a dual source using a separation member in accordance with the present invention. Illustrated are a tow vessel 12, one source array 11 connected to tow vessel 12 by a tow member 35, a streamer or deflector tow member 180, and a separation member 50. A nominal position 150 is illustrated, as well as a steerable band about nominal position 150 denoted by the double-headed arrows labeled "s", having an inner acceptance boundary 151 and an outer acceptance boundary 152. Simple calculations inform us about the force required to deflect source array 11 a given lateral distance. Assuming a 400-meter layback (approximately equal to the length of the source array tow members), a nominal deflection of about 25 meters, and an additional steerable band of about –/+25 meters about the nominal, we get the required forces illustrated in FIG. 9. According to FIG. 9A a force of L is required to deflect source array 11 out to its nominal position 150. To reach outer acceptance boundary 152 of the steerable band a force of 2 L is required as illustrated in FIG. 9B. Now, if instead a separation member 50 is installed halfway down source tow member 35 as illustrated in FIG. 9C, separation member 50 will take the forces required to steer out to nominal position 150, and the additional steering elements, such as deflecting members, only need to take the additional steering force L to reach outer acceptance boundary 152 as opposed to the required 2L force if no separation member 50 were used.

Deflectors useful in the invention may be any type of active or passive deflector, including so-called free-flying deflectors, and non-free-flying deflectors that have streamers or other trailing, drag-producing means. As used herein the term "free-flying" means a deflector that is towed but does not have suspended to its tail end a streamer or other drag-producing device. In some situations it might be desired to include a stabilizing tow member to an otherwise free-flying deflector. One suitable free-flying deflector is a variation of the non-free-flying deflector known under the trade designation "MONOWING", available from WesternGeco L.L.C., Houston, Tex. This particular embodiment of the deflector known under the trade designation MONOWING includes a main hydrofoil, a boom rigidly fixed to the main hydrofoil, and a so-called boom-wing mounted near a rear end of the boom. By rotating the boom-wing it creates movement in either positive or negative direction. This movement translates into a moment that translates into a change of the orientation of the main hydrofoil. The angle of attack of the main hydrofoil is defined by the arc between the plane in which the trailing surface of the wing lies and the direction of tow through the water. The angle of attack will lie generally in a horizontal plane, although not necessarily so. An actuator may be provided that communicates with a local controller that may adjust the orientation of the boom-wing. Communication with the tow vessel may be available through an umbilical directly connected to the tow vessel, an umbilical connected to a source, or through active, strength-taking tow members connected to the tow vessel and/or source. A local controller may also communicate with an on-board controller and/or other remote controller(s) via wireless transmission. Deflectors useful in the invention may be suspended from or attached rigidly to a float on the sea surface.

Another deflector useable in the present invention is a so-called "door" deflector. This deflector type is often used to deflect a marine seismic source to a nominal position. An array of passive hydrofoils is mounted within a frame. In three dimensions this comprises the array of hydrofoils with end plates at the top and bottom of each hydrofoil. A towing bridle or harness attached to brackets on the frame is used. A deflector tow member connects the bridle, and thus the deflector, with the tow vessel. In active door deflectors, the deflector is similar but modified to make its angle of attack remotely controllable. In the aft area of the frame a unit is included that includes a hydrofoil having function similar to a boom-wing in the deflectors known under the trade designation MONOWING, discussed above. The function of the hydrofoil in the door deflector is to create a smaller lift force that causes the deflector to orient itself with the desired angle of attack relative to incoming water flow velocity vector, F. As the total lift is a function of angle of attack $\alpha$, total lift can be adjusted by adjusting the orientation and hence the lift of the hydrofoil. As in other active deflectors, the angle of attack (orientation) of the hydrofoil may be adjusted by an actuator operatively coupled to a motor and local controller, the latter communicating with an on-board controller on the tow vessel through an umbilical connected directly to the tow vessel, or through connections with the source. A local controller may also communicate with an on-board controller and/or other remote controller(s) via wireless transmission.

Deflecting members useful in the invention may comprise a hydrodynamic body that uses the water velocity, achieved by being towed by the tow vessel through the water, to generate a lateral force to steer the source array to the desired location. It should be noted that a towed source array generally moves along the centerline of the tow vessel due to the forces exerted on the source array by the water. Alternatively, when separation ropes are used to deflect the source to a nominal preplot line a lateral distance away from, and parallel to, the centerline, then the source generally follows this preplot line. Therefore, the defecting member may be used generally to steer the source array away from the centerline of the tow vessel to a desired position or alternatively away from the preplot line if different from the centerline. Deflecting members useful in the invention may be selected from any number of available designs, including, but not limited to those having a single wing in a generally vertical arrangement and a central body; those comprising an upper wing, a lower wing, and a central body, wherein the upper and lower wings are disposed on opposite sides of the central body in a generally vertical arrangement and wherein the wings move together in similar motion; low and high aspect ratio designs actuated by bridles and controllers, and other designs. The deflecting members may be positioned at the front of their respective source array, at the aft end of a source array, or somewhere between. There may be multiple deflecting members positioned in some combination of these positions, wherein each deflecting member is the same or different. Each source array may be equipped with its own deflecting member, which may be the same or different in size and type. Smaller deflecting members may be employed than in previous designs, as will become apparent. The deflecting member may comprise an actuator that controls movement of the deflecting member, as well as connections for an umbilical, or cables, hoses and combinations thereof that carry control signals to and from the deflecting member. The actuator may move surfaces, bridles, or other features using hydraulic or pneumatic cylinders, electronically by an electric motor, or combination thereof. An electric motor may be smaller, simpler and less expensive to operate and maintain than hydraulic and pneumatic systems. The deflecting member may also contain sensors that sense the motion and position of the deflecting member or a feature thereof and transmit that information to a controller discussed below. Electrical power may be supplied to the deflecting member through conductors in the umbilical, or cable, from the tow vessel, from batteries or other electricity storage devices located on the deflecting member, or from combinations thereof.

In use the position of deflecting members associated with source arrays, or deflectors associated with sources via umbilicals and/or passive, strength-taking tow members, may be actively controlled by GPS or other position detector sensing the position of the source arrays, source, and deflectors as desired and feeding this data to a navigation system. Navigation may be performed on board a tow vessel, on some other vessel, or indeed a remote location. By using a communication system, either hardwire or wireless, information from the remote controllers may be sent to one or more local controllers on deflectors and/or deflecting members associated with source arrays. The local controllers in turn are operatively connected to adjustment mechanisms comprising motors or other motive power means, and actuators on the deflectors and/or deflecting members, which function to move a wing, plate or hydrofoil, or a bridle system, depending on the adjustment mechanism used. This in turn adjusts the angle of attack of the deflector or deflecting member, causing it to move the source as desired. Feedback control may be achieved using local sensors on the deflectors or deflecting members, which may inform the local and remote controllers of the position of a swivel connector, a wing or hydrofoil, the angle of attack of a deflector or wing or hydrofoil of a particular boom wing, a position of an actuator indicative of angle of attack, the status of a motor or pneumatic or hydraulic cylinder, the status of a bridle system, and the like. Other control schemes are possible, either alone, or cascaded with the feedback control. A control scheme may comprise a so-called feed-forward controller utilizing information about currents, wind, and other environmental conditions, in order to counteract for any deviations relative to the nominal that is predicted to take place, and do so before the deviation actually takes place or to do so in an early stage of the deviation. An adaptive control scheme may also be used. A computer or human operator can thus access information and control the entire positioning effort, and thus obtain much better control over the seismic data acquisition process.

A feature of the present invention is that when one or more source and/or streamer separation members are employed connecting the streamer tow members and source tow members, or in the case of no streamers (source vessel only), one or more separation members between the port and starboard source tow members and deflector tow members, individual deflecting members associated with each source array may be smaller, easier to handle, and also less expensive, than without such separation members. In embodiments when a tow vessel is towing multiple sources, each source may have one or more deflectors to control each source's location. If each source tow member is connected to its streamer tow members using one or more source separation members as described herein or equivalents thereof, or in the alternative where there are no streamers, to a deflector tow member as in some of the embodiments described herein or equivalents thereof, the number and/or size of deflecting members associated with each source array may be reduced. Alternatively, when less than all of the source arrays employ separation members as described herein, then for those source arrays not using the separation member technique of the invention the number of and/or size of the deflecting members connected to the source arrays will tend to be higher than when all source arrays have deflecting members, but still lower than when no separation members are employed.

The deflecting members and source separation members function together to steer the sources and their source arrays to predetermined positions and maintain the positions while being towed through the water. The predetermined positions may be along a straight line or along any other track that has been defined either from experience or from previous surveys, or the position may be one that will simply enable optimum source positions in future surveys. Furthermore, during 4-D seismic surveys, it is important that the sources be located as closely as possible to the same locations used during previous surveys of the same grid. Once the deflectors, with installed separation members, guide the sources to the desired positions, the deflecting members may be used to maintain the source arrays at the same location as used during previous surveys of the grid. Without the source separation cables, the positions of the sources and source arrays are subject to the influence of currents, waves, wind and changes in the direction of the tow vessel. By exerting lateral force on the water, the source separation cables and deflecting members can steer the source arrays to the optimum predetermined position independent of the location of streamers, the speed of the tow vessel or other influences.

Separation members useful in the invention may vary in terms of material compositions and characteristics. While not required, separation members useful in the invention may be any active tow cable (umbilical) or passive tow cable useful in marine seismic surveying. In fact any material, in any form, that may be used or thought of as being useful in the function of tying, lashing, or mooring one object to another may be used, with or without the communication/data transmission ability. Material options include metal, plastic, synthetic or natural fiber, or combination thereof. About the only material to be avoided would be anything brittle, such as ceramic, or something brittle as ceramic. However, many "filled" polymers, including ropes made using synthetic fibers, may have ceramic or other types of inorganic filler materials. The form of the separation member may as well vary, from ropes, chains, cables, and the like. Separation members may be stretchable or non-stretchable, elastic or non-elastic, buoyant or non-buoyant. The cross-section of a separation member may be round, rectangular, or any other shape, such as lobed, helical, and the like. Diameter (or largest dimension in cross-section) may range from 5 mm to 50 mm or more depending on the situation. Length of separation members may be as necessary, but may range from less than 1 meter up to 1 kilometer, or from 10 meters to 100 meters. Examples of suitable materials include yarns and stranded versions of polyamide rope, solid braid polyamide rope, stranded polypropylene rope, polypropylene/polyester combination rope, manila rope, colored hollow braid rope, rope comprising solid core and braided covering, all kinds of wire rope, such as bright steel center wire rope, bright fiber core wire rope, galvanized wire rope, stainless steel wire rope, multiple braided ropes, coated single and multiple braided ropes, and the like. Any of these materials and constructions may be used with source, deflector, and streamer tow members as well.

A single or multiple control systems monitor the location of each source and send signals to the deflecting members to steer the sources to the desired locations. While the deflectors may be used for positioning the sources relative to the tow vessel, they may be used for positioning the source arrays relative to the globe. Therefore, a positioning system unit may be attached to each source array to provide the controller with the actual location of each source array. By knowing the exact location of the positioning system units and knowing the in-line location of each acoustic source member in each source array relative to its respective positioning system unit, the controller can roughly determine the location of each acoustic source member being towed behind the tow vessel. The positioning system units may be, for example, global positioning system (GPS) units, other satellite positioning systems, lasers, an acoustic network, or any other type of unit known to one having ordinary skill in the art that may be used to determine a specific location. The controllers may compare the actual location of the positioning system units with the desired locations and then send signals to the deflecting members to steer the source arrays and thereby maintain or achieve the desired location. Since the controllers are constantly monitoring the location of the source arrays, if the arrays are moved due to currents, waves, tides, winds or other outside forces, the controllers may quickly sense the movement and instruct the deflecting members to steer the source arrays back to the desired locations. The controllers may be located on the tow vessel communicating with the actuators that move the wings on the deflecting member. Alternatively, the controller may comprise a so-called feed-forward controller utilizing information about currents, wind, and other environmental conditions, in order to counteract for any deviations relative to nominal that may be predicted to take place, and to do so before the deviation actually takes place or to do so in an early stage of the deviation. A combination control scheme may be used, where the feed-forward controller is cascaded with a feed-back controller. Adaptive controllers may also be used.

In one embodiment, an on-board controller on the tow vessel communicates with all local controllers on the deflecting members. The local controllers then transmit signals to actuators to move and/or steer the source arrays to their optimum desired location. In this embodiment, the positioning system units send signals to the navigation system of the tow vessel, which then communicates the location of the source arrays to the on board controllers. The navigation system of the tow vessel conventionally has the capability of receiving and processing the signals from the positioning system units. Alternatively, the capability of receiving and processing the signals from the positioning system units may be made part of the on-board controllers. Sensors in the central body may also monitor the position of the wing and/or the movement of the deflecting members and transmit signals providing that information to the local controllers and the on-board controller, if desired.

The on-board controller may be a computer, a distributed control system, an analog control system or other control system known to those having ordinary skill in the art. The local controllers may be one or more digital controllers, analog controllers or combinations thereof. The on-board controller and the local controllers may send control signals and receive transmitter signals or signals from each other by any means, including radio waves, electrical conductors, fiber optics or combinations thereof.

The seismic survey systems of the invention may also include an obstruction avoidance system. An acoustical transducer and receiver may be mounted on a deflecting member or on an adjacent source array. The acoustical transducer and receiver may operate in the range of typical sonar systems and may be directed in either one general direction or sweep in many directions. The acoustical transducers and receivers may be used to locate obstructions in or under the water such as, for example, undersea constructions, moored devices, free floating devices, tow cables and towed devices. When an acoustical transducer and receiver locates an obstruction, a signal may be sent to the controller (either the on-board controller or the local controller) and the controller may then signal the deflecting member to adjust the wing and steer the source array away from or around the sensed obstruction. The acoustical transducer and receiver may be powered from the local in-sea electronics. Communication signals from the acoustical transducer and receiver to the controller may be transmitted by any means, including radio waves, optical fibers or electrical conductors, or by conductors in the umbilical attached to the deflecting member. This obstructions avoidance system may be particularly useful during recovery or deployment of the arrays and streamers to avoid tangling of the tow cables.

The increased control over the location of the sources and source arrays allows them to be positioned closer to installed constructions, moored units or other known devices in or under the water without fear of entangling the tow members or sub-arrays with these obstacles. This provides increased seismic surveying of a grid by being able to gather seismic data from locations that before were avoided for fear of entangling the seismic survey equipment with obstacles in or under the water. Furthermore, the cross-line positioning control may be used to decrease the turning radius of the tow vessel without tangling the streamers.

It will be understood from the foregoing description that various modifications and changes may be made in the embodiments of the present invention without departing from the scope of the appended claims. It is intended that this description be for purposes of illustration only and should not be construed in a limiting sense. The scope of this invention should be limited only by the language of the following claims. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system comprising:
   a seismic source array;
   a seismic streamer array;
   a deflector connected to the seismic streamer array;
   a source tow member to connect the source array to a vessel;
   a streamer tow member to connect the streamer array to the vessel;
   a positioning unit to receive a signal indicative of a position of the seismic source array;
   a deflecting member comprising an actuator, the deflecting member to control the actuator to steer the seismic source array based on the position of the source array indicated by the signal; and
   a source separation member to connect the source tow member to the streamer tow member to cause the seismic source array to be steered by the deflector and the deflecting member.

2. The system of claim 1, wherein the source separation member is connected to the source tow member at an intermediate position between the vessel and the source array.

3. The system of claim 1, further comprising:
   additional source arrays connected to the tow vessel by corresponding source tow members; and
   a plurality of streamers connected to the vessel by a corresponding plurality of streamer tow members.

4. The system of claim 3 selected from: systems wherein any source tow member is connected to any streamer tow member by a source separation member; systems wherein the source separation members connect all of the plurality of source tow members at a point between the tow vessel and the source arrays, the source separation members extending from the point to the plurality of streamer tow members; and systems wherein the source separation member comprises a plurality of source separation members, each source separation member connecting one of the plurality of source tow members to one of the plurality of streamer tow members.

5. The system of claim 3 wherein: the plurality of source arrays comprises a port source comprising a plurality of port source arrays connected to the tow vessel by a corresponding plurality of port source tow members, the port source tow members connected by port distance cables, and a starboard source comprising a plurality of starboard source arrays connected to the tow vessel by a corresponding plurality of starboard source tow cables, the starboard source tow cables connected by starboard distance cables; the plurality of streamers comprises a plurality of port streamers connected to the source vessel by a corresponding plurality of port streamer tow members, and a plurality of starboard streamers connected to the source vessel by a corresponding plurality of starboard streamer tow members; the deflecting member comprises a plurality of port source array deflecting members and a plurality of starboard source array deflecting members; and the source separation member comprises a port source separation member connecting any of the port source tow members to one of the port streamer tow members and a starboard source separation member connecting any of the starboard source tow members to one of the starboard streamer tow members.

6. The system of claim 3 wherein: the plurality of source arrays comprises a port source comprising a plurality of port source arrays connected to the tow vessel by a corresponding plurality of port source array tow members, and a starboard source comprising a plurality of starboard source arrays connected to the tow vessel by a corresponding plurality of starboard source tow members; the plurality of streamers comprises a plurality of port streamers connected to the source vessel by a corresponding plurality of port streamer tow members, and a plurality of starboard streamers connected to the source vessel by a corresponding plurality of starboard streamer tow members; the source deflecting member comprises a plurality of port source deflecting members and a plurality of starboard source deflecting members; and the source separation member comprises a plurality of port source separation members, each one of the plurality of port source separation members connecting a corresponding one of the plurality of port source array tow members to one of the port streamer tow members and a plurality of starboard source separation members, each one of the plurality of starboard source separation members connecting a corresponding one of the plurality of starboard source array tow members to one of the starboard streamer tow members.

7. The system of claim 1, wherein the positioning unit comprises a positioning unit selected from a group comprising a global positioning system, a satellite positioning system, an acoustic network, a laser system and combinations of thereof.

8. The system of claim 1, wherein the deflecting member is adapted to steer the source array based on a path from a previous seismic survey and a path that maximizes coverage in a current survey.

9. The system of claim 1, wherein the deflecting member comprises:
 a wing;
 a central body; and
 a controller to position the wing based on the position indicated by the signal.

10. The system of claim 1, further comprising:
 a navigation unit located on the vessel, wherein the navigation unit is adapted to receive the signal from the positioning unit and generate a signal that is communicated to the deflecting member to control the actuator.

11. The system of claim 1, further comprising the vessel.

12. The system of claim 1, wherein the deflector is adapted to establish a nominal lateral offset for the seismic source array while the seismic source array is being towed, and the deflecting member is adapted to further adjust a position of the seismic source array while the seismic source array is being towed to cause the seismic source array to follow a predetermined path.

13. The system of claim 1, wherein the deflector comprises a passive device.

* * * * *